3,200,034
METHOD OF DESTROYING BACTERIA EMPLOYING CHLORINATED ALKYLBENZENES
Clarence W. Huffman, Glenview, Ill., assignor to International Minerals & Chemical Corporation, a corporation of New York
No Drawing. Filed Feb. 12, 1962, Ser. No. 172,749
7 Claims. (Cl. 167—30)

The present invention generally relates to a method of combating bacterial growth and in a more particular aspect relates to a method of controlling bacterial growth by contacting such organisms with an active amount of a chlorinated alkylbenzene.

The control or destruction of bacteria is of obvious commercial significance. Many compounds have been known to possess bactericidal activity; however, most of the known compounds have certain disadvantages such as low activity, non-selectivity, toxicity to desirable living matter, high costs, etc.

It is an object of the present invention to provide a novel method for combating bacterial growth.

It is another object of the present invention to provide a method of controlling bacterial growth by contacting bacteria with an effective amount of a chlorinated alkylbenzene.

It is a specific object of the invention to provide a method of controlling bacterial growth by contacting bacteria with an effective amount of chlorinated n-propylbenzene.

It is a further object of the present invention to provide a new bactericidal composition.

It is a further specific object of the invention to provide a new bactericidal composition containing a chlorinated alkylbenzene.

It is a more specific object of the present invention to provide a new bactericide containing chlorinated n-propylbenzene.

It is an additional object of the invention to provide a method of controlling bacterial growth by contacting bacteria with an effective amount of a chlorinated hydrocarbon prepared by chlorinating an alkylbenzene having 9 to 10 carbon atoms in the molecule, said chlorinated hydrocarbon containing from about 30% to about 80% by weight of chlorine.

These and other objects and advantages of the present invention will be apparent from the description of the invention.

The present invention is based on the discovery that the chlorinated hydrocarbon mixture which results from chlorinating an aromatic mixture containing predominantly $C_9$ and $C_{10}$ alkylbenzene molecules is a highly effective bactericide. This discovery has commercial significance because the bactericide has a much lower cost compared to accepted or standard bactericides. It is also significant that the bactericide of the present invention in its preferred embodiment is oil-soluble. Substantially all of the prior commercial bactericides are soluble in water but are insoluble in oils.

The aromatic mixture that is chlorinated to prepare the bactericide of the present invention is characterized by:

(A) containing essentially alkylbenzenes having 9 to 11 carbon atoms in their molecules;
(B) containing at least 80% by weight alkylbenzenes having 9 to 10 carbon atoms in their molecules; and
(C) containing at least 20% by weight n-propylbenzene.

The present invention also contemplates using as a bactericide the chlorinated hydrocarbons prepared by chlorinating an essentially pure $C_9$ or $C_{10}$ alkylbenzene, such as n-propylbenzene. However, it has been determined that the chlorinated product resulting from chlorinating a mixture of two or more alkylbenzenes is generally more effective as a bactericide and, accordingly, is preferred.

The present invention generally contemplates the chlorination of alkylbenzene mixtures wherein the alkylbenzenes consist essentially of alkylbenzenes having from about 9 to about 11 carbon atoms in their molecule. Such mixtures often are obtained as petroleum fractions and frequently are highly refined materials. The mixture that is chlorinated should also contain at least 80% by weight alkylbenzenes having 9 to 10 carbon atoms in their molecule. Representative compounds found in $C_9$–$C_{10}$ aromatic petroleum fractions of this type include, inter alia, cumene, n-propylbenzene, mesitylene, iso-butylbenzene, p-cymene, and n-butylbenzene. While the mixture to be chlorinated may contain some $C_8$ alkylbenzenes, for example 0.5% by weight, the mixture may contain substantially no $C_8$ alkylbenzenes and it is specifically preferred that the mixture that is chlorinated contain less than 20% by weight of $C_8$ alkylbenzenes and still more preferably less than 10% by weight of $C_8$ alkylbenzenes and still more preferably less than 5% by weight of $C_8$ alkylbenzenes. The presence of less than 5% by weight of $C_8$ alkylbenzenes in the mixture to be chlorinated is not particularly harmful but more than 5% and particularly more than 10% by weight of $C_8$ alkylbenzenes reduces the effectiveness of the chlorinated mixture as a bactericide.

The mixture that is chlorinated contains at least 20% by weight n-propylbenzene and it is preferred that the mixture that is chlorinated contain from about 20% to about 70% by weight monoalkylbenzene. Such compounds include: inter alia, n-propylbenzene, cumene or isopropylbenzene, n-butylbenzene and iso-butylbenzene.

In another desirable aspect the hydrocarbon mixture which is chlorinated contains from about 30% to about 80% by weight of a polyalkylbenzene selected from the group consisting of di-, tri-, and tetralkylbenzene.

Further, while the hydrocarbon mixture may contain some $C_{11}$ alkylbenzenes, it is desirable that the mixture contain less than 20% by weight of alkylbenzenes containing more than 10 carbon atoms in the molecule and more preferably less than 10% by weight, and still more preferably less than 5% by weight.

Representative hydrocarbon materials which may be chlorinated to produce the chlorinated hydrocarbon which is the effective bactericide of this invention are set forth in Table I below:

*Table I*

|  | Hi Sol[a] 98F | Hi Sol 10F | AW 2[b] | Panasol RA-21[c] |
|---|---|---|---|---|
| Monoalkyl: |  |  |  |  |
| Ethylbenzene | 3 |  | 1 |  |
| Propylbenzene | 44 | 40 | 33 | 31 |
| Butylbenzene | 12 | 16 | 24 |  |
| Total | 59 | 56 | 58 | 31 |
| Dialkyl: |  |  |  |  |
| Methylethylbenzene |  |  |  | 22 |
| Diethylbenzene |  |  |  |  |
| Propyltoluene | 29 | 5 | 6 |  |
| Dipropylbenzene |  |  |  |  |
| Total | 29 | 5 | 6 | 22 |
| Trialkyl: |  |  |  |  |
| Tripropylbenzene |  |  |  |  |
| Triethylbenzene |  |  |  |  |
| Trimethylbenzene | 11 | 39 | 32 | 45 |
| Tetramethylbenzene |  |  |  |  |
| Total | 11 | 39 | 32 | 45 |
| Other unidentified |  |  |  | 2 |

[a] Hi Sol solvents are marketed by Bronoco Sales of Ashland Oil & Refining Company.
[b] Available from Industrial Solvents Corp.
[c] Available from Amoco Chemical Company.

In the preparation of the bactericide of the present invention, the alkylbenzene is chlorinated to a degree to produce a chlorinated hydrocarbon containing from about 30% to about 80% by weight of chlorine and preferably from about 45% to about 65% by weight chlorine. It has been determined that when an alkylbenzene material having the characteristics hereinbefore set forth is chlorinated to a degree such that the product contains from about 30% to about 80% by weight chlorine, the product is a highly effective bactericide. The chlorination is preferably effected to a degree such that at least 40% of the total chlorine content is aliphatic chlorine. This aliphatic chlorine represents chlorine which has been substituted for hydrogen of the alkyl groups as well as chlorine which has added to the double bonds of the aromatic ring. It is further preferred that from about 45% to about 80% of the total chlorine content is aliphatic chlorine.

The bactericidal material of the present invention may be prepared by any suitable chlorination method, many of which are disclosed in the art, to effect the desired degree of chlorination. Since the chlorination process, per se, does not form an essential feature of the present invention and since various chlorination processes are disclosed in various references, a further description of the chlorination process is not necessary for a complete understanding of the present invention.

It will be understood, of course, that the chlorinated hydrocarbon compounds of the present invention may be utilized in various bactericidal formulations, both liquid and solid, including finely-divided powders and granular materials, solutions, concentrates, emulsified concentrates, slurries and the like, depending upon the application intended and the formulation medium desired. Thus it will be appreciated that compounds of this invention may be employed to form bacterially active substances containing such compounds as essential active ingredients thereof, which compositions may also include finely-divided dry or liquid diluents, extenders, fillers, conditioners, including various clays, diatomaceous earth, talc, spent catalyst, alumina silica materials and incorporating liquid solvents, diluents, etc., typically water and various organic liquids such as kerosene, benzene, toluene, xylene, cyclohexanone and other petroleum distillate fractions or mixtures thereof. When liquid formulations are employed, or dry materials prepared which are to be used in liquid form, it is desirable in certain instances to additionally employ a wetting, emulsifying, or dispersing agent to facilitate use of the formulation.

The term "carrier" as employed in the specification and claims is intended to refer broadly to the materials constituting a major proportion of a bacterially active or other formulation and hence includes finely-divided material, both liquids and solids, as aforementioned, conventionally used in such application.

The compounds of the present invention may be used alone or in combination with other known materials, such as organic phosphorous compounds, foliage and soil fungicides, pre- and post-emergent herbicides and the like.

The term "bactericide" is intended to refer broadly to a composition of matter effective in controlling or killing, collectively or selectively, bacteria (Schizomycetes), e.g., Erwinia, Escherichia, Xanthomonas and Staphylococcus. It is preferred that the bacteria be contacted with a bactericidal amount of the composition of the present invention. In order to demonstrate the bactericidal activity of the compounds of this invention tests were run as described in the following examples.

EXAMPLE I

A mixture of monoakylbenzenes and polyalkylbenzenes as indicated below in Table II were used in this example. The analysis was made by vapor phase chromatograms.

Table II

| Compound: | Wt. percent |
|---|---|
| Ethylbenzene | 3 |
| Cumene | 5 |
| n-Propylbenzene | 39 |
| Mesitylene | 11 |
| Iso-butylbenzene | 9 |
| p-Cymene | 29 |
| n-Butylbenzene | 3 |
| Minor constituents | 1 |

Three hundred grams of this mixture were heated to 212° F. in a flask equipped with a stirrer and a gas dispersion tube. Chlorine was added over a 9½ hour period and the flask was lightly heated during the chlorination to maintain the temperature within the range of about 212° F. to 221° F. The liquid product weighed 688 grams and had a total chlorine content of 57.4% by weight with about 63% of the total chlorine being aliphatic chlorine.

The chlorinated product, designated product A, was an effective bactericide as shown by a standard and accepted evaluation test. The procedure used in the evaluation of the bactericide is as follows:

Using *Staphylococcus aureus* (gram positive) and *Salmonella typhosa* (gram negative), transfer inoculum from stock cultures to 5 ml. nutrient broth in Bakelite capped bacteriological test tubes. Next transfer 1 loop of a 24 hour old culture to 10 ml. sterile nutrient agar held in 110° F. water bath. Pour nutrient agar immediately into 9.6 cm. sterile plastic petri plate and gently swirl to distribute bacteria uniformly throughout media. Allow to set for one to two hours.

Four samples of the chlorinated product were then separately dissolved in acetone to various concentrations given below in Table III. Ten ml. dosage amounts were then placed in separate sterile test tubes. Blank sterile paper discs of 0.7 cm. in diameter were then dipped in the liquids in the test tubes and then placed on the seeded nutrient agar. Bactericidal or bacteriostatic activity was measured by the diameter of the "clear" zone or zone of inhibition surrounding the diffusion disc. Readings were taken after two days. The results of these tests are given below in Table III.

Table III

| Product | Dosage in p.p.m. | Inhibition zone *Staphylococcus aureus* (+) | Diameter (cm.) *Salmonella typhosa* (−) |
|---|---|---|---|
| A (chlorinated mixture) | 2000 | 2.8 | 0 |
|  | 1000 | 3.0 | 0 |
|  | 100 | 1.9 | 0 |
|  | 20 | 0 | 0 |

For comparative purposes a bactericide, 3,5,3',4'-tetrachlorosalicylanilide (made by Geigy Industrial Chemicals), designated product B, was tested for bactericidal activity in the same manner. The results were as follows:

| Product | Dosage in p.p.m. | Inhibition zone *Staphylococcus aureus* (+) | Diameter (cm.) *Salmonella typhosa* (−) |
|---|---|---|---|
| B (3,5,3',4'-tetrachlorosalicylanilide) | 2000 | 3.8 | 1.2 |
|  | 1000 | 2.6 | 0 |
|  | 200 | 2.1 | 0 |
|  | 100 | 1.7 | 0 |
|  | 20 | 0 | 0 |

The results of these tests illustrate that the bactericide of the present invention was highly effective and compared very favorably with a known bactericide. In fact in the lower concentrations, the bactericide of this invention was superior to the known bactericide.

EXAMPLE II

The individual components of the alkylbenzene mixture given in Table II were chlorinated in substantially the same manner described in Example I except the time of chlorination varied. Each of the chlorinated products was then tested at various concentration levels for bactericidal activity substantially as described above in Example I. The chlorination times, the total amount of chlorine in the chlorinated material, the percent of total chlorine as aliphatic chlorine, and results of the bactericidal activity testing are given below in Table IV. Several other compounds were also tested for comparative purposes.

Table IV

| Product | Percent of total Cl as Aliphatic Cl | Time of chlorination, hrs. | Dosage, p.p.m. | Inhibition zone Staphylococcus aureus (+) | Diameter (cm.) Salmonella typhosa (−) |
|---|---|---|---|---|---|
| Chlorinated ethylbenzene (50.9% Cl) | 51.2 | 12 | 2,000 | 0 | 0 |
| Chlorinated cumene (46.4% Cl) | 75.8 | 10 | 10,000 | 1.2 | 0 |
|  |  |  | 5,000 | 0 | 0 |
| Chlorinated n-propylbenzene (51.0% Cl) | 77.0 | 13 | 10,000 | 3.6 | 0 |
|  |  |  | 5,000 | 1.8 | 0 |
| Chlorinated mesitylene (60.9% Cl) | 79.3 | 8 | 5,000 | 1.5 | 0 |
|  |  |  | 2,500 | 1.3 | 0 |
|  |  |  | 1,000 | 1.4 | 0 |
|  |  |  | 100 | 0.5 | 0 |
| Chlorinated iso-butylbenzene (50.0% Cl) | 72.8 | 26 | 10,000 | 1.3 | 0 |
|  |  |  | 5,000 | 0.0 | 0 |
| Chlorinated p-cymene (54.0% Cl) | 78.7 | 19 | 10,000 | 1.1 | 0 |
|  |  |  | 5,000 | 0 | 0 |
| Chlorinated n-butylbenzene (55.7% Cl) | 65.6 | 9 | 2,000 | 1.3 | 0 |
| Chlorinated diethyl-benzene (55.9% Cl) | 57.9 | 14 | 2,000 | 1.1 | 0 |
| Chlorinated o-xylene (56.5% Cl) | 70.0 | 16.5 | 2,000 | 0 | 0 |
| Chlorinated m-xylene (60.9% Cl) | 88.3 | 15 | 2,000 | 0 | 0 |
| Chlorinated p-xylene (56.5% Cl) | 96.6 | 9.5 | 2,000 | 0 | 0 |

The tests of Example II illustrate the particular bactericidal effectiveness of the mixture as compared to individual components. The tests also illustrate that n-propylbenzene which is chlorinated to the degree described in the specification is an effective bactericide.

The description of the invention utilized specific reference to certain process details; however, it is to be understood that such details are illustrative only and not by way of limitation. Other modifications and equivalents of the invention will be apparent to those skilled in the art from the foregoing description.

Having now fully described and illustrated the invention, what is desired to be secured and claimed by Letters Patent is set forth in the appended claims.

I claim:

1. The method of controlling bacterial growth which comprises contacting bacteria with a bactericidal amount of a chlorinated hydrocarbon prepared by chlorinating an aromatic mixture consisting essentially of alkylbenzenes having 9 to 11 carbon atoms per molecule, at least 80% of said alkylbenzenes having 9 to 10 carbon atoms per molecule and at least 20% of said alkylbenzenes being n-propylbenzene.

2. The method of controlling bacterial growth which comprises contacting bacteria with a bactericidal amount of a chlorinated hydrocarbon prepared by chlorinating an aromatic mixture consisting essentially of alkylbenzenes having 9 to 11 carbon atoms per molecule, at least 80% of said alkylbenzenes having 9 to 10 carbon atoms per molecule and at least 20% of said alkylbenzenes being n-propylbenzene, the chlorinated hydrocarbon containing from about 30% to about 80% by weight of chlorine.

3. The method of controlling bacterial growth which comprises contacting bacteria with a bactericidal amount of a chlorinated hydrocarbon prepared by chlorinating an aromatic mixture consisting essentially of alkylbenzenes having 9 to 11 carbon atoms per molecule, at least 80% of said alkylbenzenes having 9 to 10 carbon atoms per molecule and at least 20% of said alkylbenzenes being n-propylbenzene, the chlorinated hydrocarbon containing from about 45% to about 65% by weight of chlorine.

4. The method of controlling bacterial growth which comprises contacting bacteria with a bactericidal amount of a chlorinated hydrocarbon prepared by chlorinating an aromatic mixture consisting essentially of alkylbenzenes having 9 to 11 carbon atoms per molecule, at least 80% of said alkylbenzenes having 9 to 10 carbon atoms per molecule and at least 20% of said alkylbenzenes being n-propylbenzene, the chlorinated hydrocarbon containing from about 30% to about 80% by weight of chlorine, and at least 40% of said chlorine being aliphatic chlorine.

5. The method of controlling bacterial growth which comprises contacting bacteria with a bactericidal amount of a chlorinated hydrocarbon prepared by chlorinating an aromatic mixture consisting essentially of alkylbenzenes having 9 to 11 carbon atoms per molecule, at least 80% of said alkylbenzenes having 9 to 10 carbon atoms per molecule and at least 20% of said alkylbenzenes being n-propylbenzene, the chlorinated hydrocarbon containing from about 45% to about 65% by weight of chlorine and from about 40% to about 80% of said chlorine being aliphatic chlorine.

6. The method of controlling bacterial growth which comprises contacting bacteria with a bactericidal amount of chlorinated n-propylbenzene, said chlorinated n-propylbenzene containing from about 45% to about 65% by weight of chlorine, and from about 40% to about 80% of said chlorine being aliphatic chlorine.

7. A bactericide comprising a bactericidal amount of chlorinated n-propylbenzene containing from about 45% to about 65% by weight of chlorine, about 40% to about 80% of said chlorine being aliphatic chlorine, and a carrier.

References Cited by the Examiner

UNITED STATES PATENTS

| | | | |
|---|---|---|---|
| 1,947,926 | 2/34 | Steindorff et al. | 167—30 |
| 2,174,069 | 9/39 | Dreisbach | 260—650 |
| 2,929,838 | 3/60 | Rickert | 167—30 |
| 2,996,554 | 8/61 | Olah et al. | 260—650 |

FOREIGN PATENTS 591,273  8/57  Great Britain.

OTHER REFERENCES

King: U.S. Dept. of Agr., Agr. Handbook, No. 69, May 1954, pp. 66, 67, 338.

JULIAN S. LEVITT, *Primary Examiner.*

MORRIS O. WOLK, LEWIS GOTTS, *Examiners.*